(12) United States Patent
Muschett et al.

(10) Patent No.: US 8,639,515 B2
(45) Date of Patent: Jan. 28, 2014

(54) EXTENDING VOICE-BASED MARKUP USING A PLUG-IN FRAMEWORK

(75) Inventors: Brien H. Muschett, Palm Beach Gardens, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1864 days.

(21) Appl. No.: 11/271,594

(22) Filed: Nov. 10, 2005

(65) Prior Publication Data

US 2007/0106934 A1 May 10, 2007

(51) Int. Cl.
*G10L 21/00* (2013.01)
*G10L 25/00* (2013.01)

(52) U.S. Cl.
USPC .................. 704/275; 704/270; 704/270.1

(58) Field of Classification Search
USPC .......................................... 704/270
See application file for complete search history.

(56) References Cited

U.S. PATENT DOCUMENTS

| | | | | |
|---|---|---|---|---|
| 6,604,209 B1 * | 8/2003 | Grucci et al. | ................. | 714/38.1 |
| 6,732,330 B1 * | 5/2004 | Claussen et al. | .............. | 715/234 |
| 7,028,306 B2 * | 4/2006 | Boloker et al. | ................ | 719/310 |
| 2002/0169806 A1 * | 11/2002 | Wang et al. | ................... | 707/541 |
| 2002/0191756 A1 | 12/2002 | Guedalia et al. | | |
| 2002/0198719 A1 * | 12/2002 | Gergic et al. | .............. | 704/270.1 |
| 2002/0198720 A1 | 12/2002 | Takagi et al. | | |
| 2003/0055651 A1 * | 3/2003 | Pfeiffer et al. | ............. | 704/270.1 |
| 2003/0225825 A1 * | 12/2003 | Healey et al. | ................. | 709/203 |
| 2004/0012630 A1 * | 1/2004 | Carels et al. | ................... | 345/760 |
| 2004/0021899 A1 | 2/2004 | Jost et al. | | |
| 2004/0123236 A1 | 6/2004 | Cheung et al. | | |
| 2004/0153967 A1 * | 8/2004 | Bender et al. | ................. | 715/513 |
| 2004/0205579 A1 * | 10/2004 | Brassell et al. | ............... | 715/513 |
| 2004/0221261 A1 * | 11/2004 | Blevins | ........................ | 717/107 |
| 2004/0258217 A1 * | 12/2004 | Kim | .......................... | 379/88.17 |
| 2005/0028085 A1 | 2/2005 | Irwin et al. | | |
| 2005/0043952 A1 | 2/2005 | Sharma et al. | | |
| 2005/0055403 A1 | 3/2005 | Brittan | | |

OTHER PUBLICATIONS

Bakker et al, "Next Generation Service Creation Using XML Scripting Languages", 2002, IEEE International Conference on Communications, vol. 4, pp. 2001-2007.*

* cited by examiner

*Primary Examiner* — Richemond Dorvil
*Assistant Examiner* — Olujimi Adesanya
(74) *Attorney, Agent, or Firm* — Patents on Demand P.A.; Brian K. Buchheit; Scott M. Garrett

(57) ABSTRACT

A method for extending supported voice markup. The method can include a step of identifying a reference implementation (RI) for a software component that interprets voice-based markup. The RI can define a manner that the software component interprets voice-based markup. At least one plug-in can be identified that contains an extension to the RI. At runtime, the RI can be dynamically modified in accordance with the at least one plug-in. The software component can interpret voice-based markup documents based upon the modified reference implementation.

20 Claims, 2 Drawing Sheets

EXTENDING VOICE-BASED MARKUP USING A PLUG-IN FRAMEWORK

BACKGROUND

1. Field of the Invention

The present invention relates to the field of browser design and, more particularly, to a voice browser that uses a plug-in framework to extend a supported markup language.

2. Description of the Related Art

Voice extensible Markup Language (VoiceXML) is a markup language standardized by the World Wide Web Consortium (W3C) for specifying interactive voice dialogues between human and computer, such as dialogues used by an Interactive Voice Response (IVR) system. VoiceXML has defined tags that instruct a VoiceXML interpreter to provide speech synthesis, automatic speech recognition, dialog management, sound playback, Dual Tone Multi-Frequency (DTMF) key press recognition, and telephony call control functions. A common architecture in which VoiceXML interpreters are utilized includes a bank of deployed VoiceXML interpreters attached to a Public Switched Telephone Network (PSTN).

Although based upon a Standard General Markup Language (SGML) language, specifically the extensible Markup Language (XML), VoiceXML should not be confused with HyperText Markup Language (HTML), which is an SGML based language in which is many Web pages are written.

HTML was designed for visual Web pages and lacks an ability to control user-application interactions that are necessary for a speech-based interface. A HTML interface is designed to process multiple elements at a time and to display the results of these processed elements simultaneously.

A voice-based markup interpreter, such as a VoiceXML interpreter, has numerous constraints and functions related to speech-based interfaces that cause voice-based interpreters to operate in a manner distinct from a manner in which visual markup interpreters or visual browsers operate. For example, with a speech-based interface that presents VoiceXML output, only one element is processed and/or presented at a time, since a user can only hear one item at a time.

It is a common practice for VoiceXML interpreters to include features outside of the standards. These features allow VoiceXML application authors to tap into Computer Telephony Integration (CTI) code, to integrate new VoiceXML code with legacy code, and to provide platform specific functions. CTI is a technology that allows interactions on a telephone and a computer to be integrated or coordinated. CTI services include, but are not limited to, Automatic Call Distribution (ACD) services, power dialing services, IVR services, and other customer facing or agent facing services.

Adding extensions to a VoiceXML reference implementation (RI) is commonly solved by obtaining the source code, and modifying the source code as desired. A RI as used herein is a baseline implementation of a markup interpreter that specifies supported voice-based markup. It should be appreciated that integrating proprietary extensions on a RI by modifying source code, results in a single, monolithic code stream containing the base code, the proprietary extensions, and related code modifications.

This conventional approach has numerous drawbacks. One drawback is that RI updates are difficult to integrate because extensions are woven into the RI. Consequently, code to be maintained includes both the RI and extensions. Maintenance costs can be extensive because RI expertise and extension expertise reside in different groups, each group somewhat unfamiliar with details pertaining to the other. Cost for outsourcing code maintenance to one or more external groups can be high.

Another drawback is that a solution achieved by modifying source code to include the RI and proprietary extension results in a proprietary solution. The propriety solution cannot be bundled in a compartmentalized fashion for resale in a manner that allows multiple value added resellers to easily add additional features. Instead, adding new features requires each feature provider to modify the RI and/or to modify an RI that includes extensions. Coordinating efforts for a customized solution among different feature providers can be time consuming, expensive, and can result in code conflicts caused by incompatibilities in the added features.

What is needed is a mechanism for adding extensions to VoiceXML interpreters that does not require the source code of the VoiceXML interpreter to be modified.

SUMMARY OF THE INVENTION

A system and method for extending voice-based markup supported by a voice markup interpreter via a plug-in framework in accordance with an embodiment of the inventive arrangements disclosed herein. More specifically, a voice markup interpreter that supports a defined voice-based markup language can load one or more packages containing language extensions. The extensions can represent a modification of an existing interpreter functionality or a new functionality. The loaded language extensions can be linked to the interpreter so that the browser can interpret markup that utilizes the language extension. The extensions can be implemented in a standardized, interpreter independent manner that permits third party venders to construct packages including markup language extensions. Users can utilize those extension packages within an interpreter of their choice.

The present invention can be implemented in accordance with numerous aspects consistent with material presented herein. For example, one aspect of the present invention can include a method for extending supported voice markup. The method can include a step of identifying a reference implementation (RI) for a software component that interprets voice-based markup. The RI can define a manner that the software component interprets voice-based markup. At least one plug-in can be identified that contains an extension to the RI. At runtime, the RI can be dynamically modified in accordance with at least one plug-in. The software component can interpret voice-based markup documents based upon the modified reference implementation.

Another aspect of the present invention can include another method for extending markup supported by a voice browser. The method can identify a voice browser that interprets information written in a voice-based markup language. The method can also identify an extender including at least one extension to the voice-based markup language, where the voice browser does not normally support the extension. The extender can be loaded at runtime. The voice-based markup language supported by the voice-browser can include the extension.

Still another aspect of the present invention can include a voice browser that includes a means for interpreting information written in a voice-based markup language. The voice browser can include an implementation of a plug-in framework. The voice browser can further include a means for utilizing plug-in packages in compliance with the plug-in framework. Each of the plug-in packages can extend the voice-based markup language supported by the voice browser without altering source code of the voice browser.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or in any other recording medium. The program can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
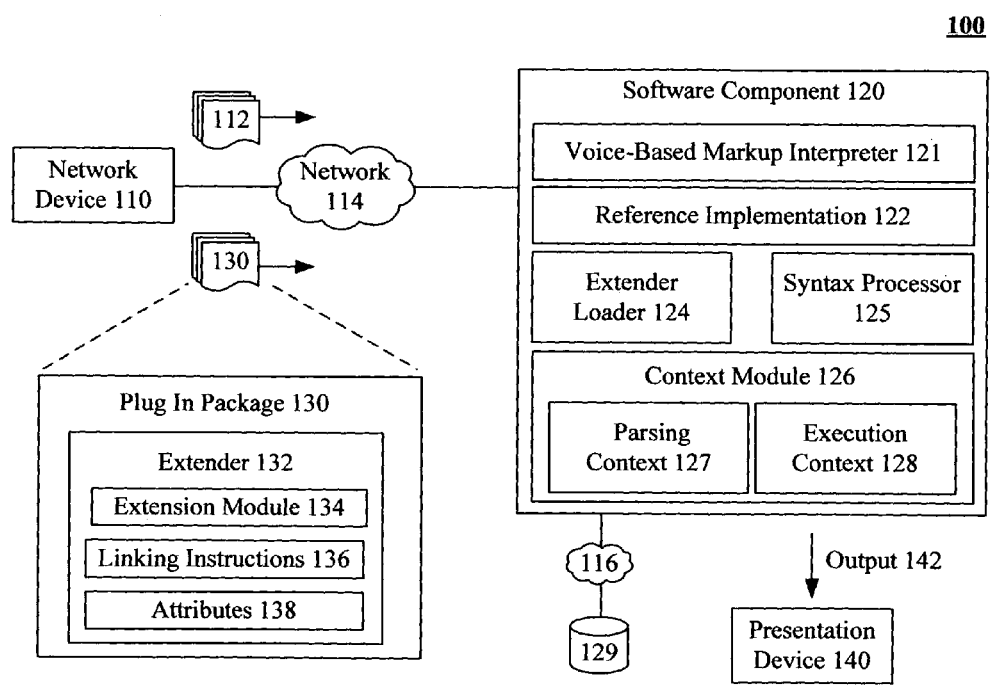
FIG. 1 is a schematic diagram illustrating a system including a software component configured with an ability to extend its supported markup language in accordance with an embodiment of the inventive arrangements disclosed herein.

FIG. 1 is a schematic diagram illustrating a system 100 including a software component configured with an ability to extend its supported markup language in accordance with an embodiment of the inventive arrangements disclosed herein. System 100 can include network device 110, presentation device 140, and software component 120.

The network device 110 can be any device that conveys either a voice-based markup document 112 or a plug-in package 130 to software component 120 via network 114. Network device 110 can be a physical network device, a set of distributed but functionally related devices, a virtual computing device, and the like. In one embodiment, network device 110 can represent a Web server that provides voice-based markup documents 112 responsive to Hyper Text Transfer Protocol (HTTP) based requests. Network device 110 can also include a File Transfer Protocol (FTP) server that conveys one or more plug-in packages 130 to software component 120. The present invention is not to be construed as limited to any particular data conveyance protocol and use of any Transmission Control Protocol/Internet Protocol (TCP/IP) based protocol or alternative transport protocol is contemplated herein.

Voice-based markup document 112 and a plug-in package 130 can be conveyed from the same network device 110 and/or can be conveyed by different network devices 110. In one embodiment, the voice-based markup document 112 can be conveyed at approximately the same time as an associated plug-in package 130. In another embodiment, markup document 112 can be conveyed before or after an associated plug-in package 130 is conveyed.

For example, a plug-in package 130 associated with voice-based markup document 112 and required by software component 120 to interpret voice-based markup document 112 can be conveyed to and loaded within software component 120 when the software component 120 is loaded or instantiated. In another example, a voice-based markup document 112 can be conveyed to software component 120, software component 120 can determine a need for associated plug-in package 130 before interpreting voice-based markup document 112, and the plug-in package 130 can be automatically or interactively acquired responsive to the determined need.

Voice-based markup document 112 refers to an electronic document written in accordance with a voice-based markup language that describes the structure and appearance of a document. Voice-based markup document 112 can be a document that includes markup tags that describe platform independent styles that specify how the content of the voice-based markup document 112 is to be rendered. Voice-based markup document 112 can include any Standard Generalized Mark-Up Language (SGML) based document that includes speech processing and/or call control functionality.

As used herein, an SGML based document includes documents based upon derivatives, subsets, and supersets of SGML. Speech processing and/or call control functionality for the SGML based document can be implemented in accordance with any of a variety of available standards and derivatives thereof.

For example, the voice-based markup document can include, but is not limited to, a Voice eXtensible Markup Language (VoiceXML) document, a Speech Synthesis Markup Language (SSML) document, a Speech Recognition Grammar (SRGS) document, a Semantic Interpretation Language document, a Call Control eXtensible Markup Language (CCXML) document, a European Computer Manufacture's Association Script (ECMAScript) based document, an X+V document, a Speech Application Language Tags (SALT) document, a JAVA Speech Markup Language (JSML) based document, a JAVA Speech Grammar format (JSGF) based document, a Synchronized Multimedia Integration Language (SMIL) document, and the like.

Plug-in package 130 refers to an electronic message that defines a markup language extension. A plug-in package 130 can define a markup language extension not normally supported by the software component 120. The software component 120 can load plug-in-package 130, extract the necessary information about the specified extension, and can thereafter handle voice-based markup documents 112 in accordance with the package 130 specifications. The loading of a package 130 can occur dynamically at run-time. Package 130 can comply with a standardized framework defined for extending markup. Consequently, package 130 can be implemented in an independent fashion, assuming that a software component 120 to be utilized complies with the standards specified for the standardized framework.

Plug-in package 130 can include one or more extenders 132. An extender 132 is a set of machine readable instructions that are associated with a markup language. Extender 132 can define a new language tag, attribute, property, or object that was not previously part of a markup language supported by software component 120. Extender 132 can also define a replacement functionality or functionality implementation for an existing functionality of software component 120.

Extender 132 can include an extension module 134, a set of linking instructions 136, and/or attributes 138. The extension module 134 can include code that is use to handle a defined markup function. The linking instructions 136 can specify the manner in which the software component 120 is to link to the extension module 134. Linking instructions 136 can specify one or more manner in which the extension module 134 is to be linked to the software component 120. Linkages can include, for example, a document type definition (DTD) linkage, a schema linkage, and/or other linkages.

Software component 120 can include a software application hosted upon a computing device capable of producing output 142 based upon voice-based markup document 112. The software application can include any speech-based or speech-enabled application. The software application can optionally include a graphical user interface (GUI) and/or GUI supporting components in addition to including speech components. For example, the software application can include a voice browser and/or a Multi-modal browser. Output 142 can be presented upon presentation device 140.

Software component 120 can include voice-based markup interpreter 121 and reference implementation (RI) 122. RI 122 can define a manner that the software component 120 interprets voice-based markup. That is, the RI 122 can define tags, functionality, attributes, execution instructions, and the like that the interpreter 121 utilizes when rendering voice-based markup document 112.

RI 122 can by dynamically modified at runtime to include extensions contained within extension module 134 as defined by plug-in package 130. After this modification occurs, software hooks to extension module 134 can be included within suitable locations of interpreter 121. Software hooks to extension module 134 can be included within suitable locations of interpreter 121.

In one embodiment, platform specific objects can be added as extension points of the RI 122. A definer can classify the platform specific objects as extension points to the standard object. A mapping can be created to permit an object tag associated with the standard object to access the platform specific objects. Accordingly, data flowing to and from the object can be coordinated by interpreter 121. Using platform specific objects, legacy code can be introduced into a programming model as an extension point library.

Software component 120 can also include extension loader 124, syntax processor 125, and, context module 126. Extension loader 124 can load plug-in package 130. Extension loader 124 can link or attach extension module 134 to software component 120 in accordance with linking instructions 136 and attributes 138.

In one embodiment, the extension loader 124 can place extension modules 134 in a data store 129. Data store 129 can be located in a storage space local to software component 120 or can be located in a storage space remotely located from software component 120. When remotely located, data store 129 can be accessed via network 116.

The extension loader 124 can load extender 132 at runtime. Attributes 138 can specify various times at which the extension loader 124 is to load an extender 132. For example, the extender 132 can be loaded when software component 120 loads, when markup document 112 is parsed, when markup document 112 is processed, when events occur, at a designated time before the software component 120 receives input from a data source, at a designated time after the software component 120 receives input from a data source, at a designated time before output 142 is processed or generated, at a designated time after output 142 is processed, and the like.

Syntax processor 125 can include a list of the elements, attributes, comments, notes, and entities contained in the markup document 112, as well as their relationships to one another. In one embodiment, syntax processor 125 can be Document Type Definition (DTD) processor where the structure and rules for markup document 112 are defined by a DTD. The syntax processor 125 can also be a XML schema processor that defines structure and rules using XML code contained within markup document 112.

The syntax processor 125 can possess an ability to dynamically generate a DTD or schema. For example, the linking instructions 136 can include DTD snippets isolated in functionality to the extender 132. The snippets can be automatically and dynamically added at runtime to pre-existing, static DTD instructions. That is, the syntax processor 125 can produce an operational DTD to be used in parsing markup document 112 based upon linking instructions 136.

Context module 126 provides the software component 120 with a parsing context 127 and an execution context 128 to language extensions defined by plug-in package 130. Context module 126 can utilize standardized Application Program Interfaces (APIs) for controlling the voice-based interpreter 121 and for performing operations related to speech, telephony, and media. The APIs can also permit status queries, such as queries for information related to a current execution context 128.

Items related to parsing context can include, but are not limited to, a Document Object Model (DOM), parsed text, and the like. Items related to the execution context 128 can include, but are not limited to, a prompt queue, a grammar stack, platform services, an ecmaScript execution environment, and the like.

Presentation device 140 can be any device capable of presenting output 142. In one embodiment, presentation device 140 can be a client device upon which software component 120 executes, such as a client device containing a multi-modal browser. In such an embodiment, presentation device 140 can include a computer, a personal data assistant (PDA), a tablet computer, and a smart phone. Presentation device 140 can also be a telephone device that presents audible output, such as a telephone that a user can utilize to interface with an Interactive Voice Response (IVR) system, where the IVR system can utilize software component 120 to interpret voice-based markup.

Network 116 and network 114 can be configured to permit the conveyance of data that is encoded in a carrier wave. Network 116 and network 114 can include one or more local area networks, wide area networks, metropolitan area networks, and the like. Network 116 and network 114 can also include packet based components and circuit based components. Network 116 and network 114 can include wireless as well as line based communication pathways.

Further, network 116 and network 114 can include computing components communicatively linking devices comprising a single machine to each other. Network 116 and network 114 can also include components communicatively linking devices functioning as a virtual machine or as a distributed computing device to one another. Network 116 and network 114 can further include components and computing devices linking two or more remotely located computing devices to each other through a network based communication protocol, such as a Transmission Control Protocol/Internet Protocol (TCP/IP) network protocol.

Interaction among the components of system 100 can be clarified through an example as follows. It should be appreciated that the following example is for illustrative purposes only and that the invention should not be construed as limited to the specific arrangements used within. In the example, software component 120 can access a Web server (network device 110) to retrieve a Voice XML markup document (voice-based markup document 112). The voice-based markup document 112 can include a new markup language tag called <pause>, as shown below.

```
<?xml version="1.0" encoding="UTF-8"?>
<vxml version ="2.0" xmlns="http://www.w3.org/2001/vxml"
    xmlns:xsi="http://www.w3.org/2001/XMLSchema-instance"
    xsi:schemaLocation="http://www.w3.org/2001/vxml
    http://www.w3.org/TR/voicexml20/vxml.xsd">
<form>
    <block>
        <var name="age" expr="45"/>
        <if cond="age == 15">
            <pause duration="1000"/>
        <elseif cond="age == 45"/>
            <pause duration="2000"/>
        <else/>
            <pause duration="3000">
        </if>
    </block>
</form>
</vxml>
```

Code Illustration 1: Sample VoiceXML Document with Pause Tag

The above sample can alter a pause time depending upon a user's age, thereby giving older users who may be less familiar with a computer interface and/or more patient than younger users an increased response time relative to younger users. The pause tag can provide an ability to pause the VoiceXML dialog during execution of any control items. The <pause> tag can include a duration attribute.

A plug-in package 130 can include extender 132 for implementing the <pause> tag. The plug-in package can include a descriptor as shown below. The illustrated descriptor utilizes JAVA archives (JARs) to package a DTD description, an extension point, a parse module, and a process module.

```
<?xml version="1.0" encoding="UTF-8"?>
<vb_plugins version ="1.0">
    <plugin name="pause">
        <dtd definition="jar:
            http://www.widgets.com/widges/vxml/pause.jar!/
            parseModule.class/pause.dtd"
        extension_point="jar:
            http://www.widgets.com/widges/vxml/pause.jar!/
            parseModule.class/insertpause.dtd">
        <parse_module uri="jar:
            http://www.widgets.com/widges/vxml/pause.jar!/
            parseModule.class"/>
        <process_module uri="jar:
            http://www.widgets.com/widges/vxml/pause.jar!/
            processModule.class"/>
    </plugin>
</vb_plugins>
```

Code Illustration 2: Sample Descriptor for Plug-In Package

Both the plug-in package 130 and the voice-based markup document 112 can be conveyed to software component 120 via network 114. Extender loader 124 can load the plug-in package 130 in the software component 120. Loading the plug-in package 130 can include establishing links for triggering the extension module 134. Extension module 134 can be loaded in data store 129. Extension module 134 can execute when a pointer referencing the extension module 134 is triggered by the markup rendering processor 124.

When the software component 120 loads plug-in package 130, modules associated with a plug in package 130 (e.g. parseModule.class) can be loaded. An extension table for these modules can be built at this time. For example, the extension table can map a "pause" key to a "pause" event handler. It should be noted that multiple plug-ins that enable multiple extension points can be enabled at once. The code sample below illustrates how the RI 122 can be support extension points relating to plug-in package 130.

```
void mainVXMLprocess( ) {
    ...
    // Encounter next element
    // Look-up element in extension table, for this example
    "pause" is the key
        // and the object "PausePluginProcessing" is the value.
        // Note this enables multiple extension points to be active
    at once.
        if( extensionTable.containsKey(element) ) {
            PluginProcessing plugin =
            PluginProcessing)extTbl.get(element);
        // Call PausePluginProcessing object's 'process'
    method
            plugin.process(dom,me,context vxmlIC);
        }
    ...
}
```

Code Illustration 3: Sample Extending Reference Implementation

The plug-in framework of the software component 120 can require that modules be supplied for parsing and processing VoiceXML. A sample parsing interface and a sample processing interface are illustrated below.

```
interface PlugInParse throws ParseException {
    void parse (Node parent, Node you, Attributes _attrs);
}
```

Code Illustration 4: Sample Parsing Interface

```
interface PluginProcessing throws ProcessingException {
    void process (Document dom, Node me,
        EcmaScriptExecutionContext context,
        VoicexmlIntpreterContext vxmlIC);
}
```

Code Illustration 5: Sample Execution Interface

It should be appreciated from the above, that implementations of the parsing and execution interface permit designers to determine parent and sibling relationships. Accordingly, "you" can get yourself as a node and obtain the attributes/ values used to construct "you". This provides an opportunity to modify/restrict contents of a node.

In one embodiment, the plug-in framework for software component 120 can require the DTD that represents the new markup to be defined. A DTD Snippet for the <pause> feature is shown below.
<!ELEMENT html (pause)*>

Code Illustration 6: DTD Snippet of for Pause Extension

The DTD Snippet for the <pause> extension can be automatically added at runtime to a static compliant markup DTD.

The Syntax processor 125 can add the <pause> extension to the markup DTD at runtime. That is, the syntax processor 125 can take a plug-in package 130 and can dynamically produce an operational DTD to be used in parsing the voice-based markup document 112.

In one embodiment, the plug-in framework for browser 120 can require the pause extension to hook into the APIs of context module 126 of markup document 112. This can require that both a parsing context 127 and an execution context 128 be defined for the pause extension. The below code illustrates sample code.

```
class PausePluginProcessing implements PluginProcessing throws
ProcessingException {
    void process (Document dom, Node me,
        EcmaScriptExecutionContext context,
        VoicexmlIntpreterContext vxmlIC) {
        long duration = Long.parseLong
        (me.getAttribute ("duration"));
        if (duration > -1)
            Thread.currentThread.sleep (duration);
        else
            throw ProcessinException ("Illegal duration
value");
        }
}
```

Code Illustration 7: Sample Plug-In Processing Class

Figure 2:
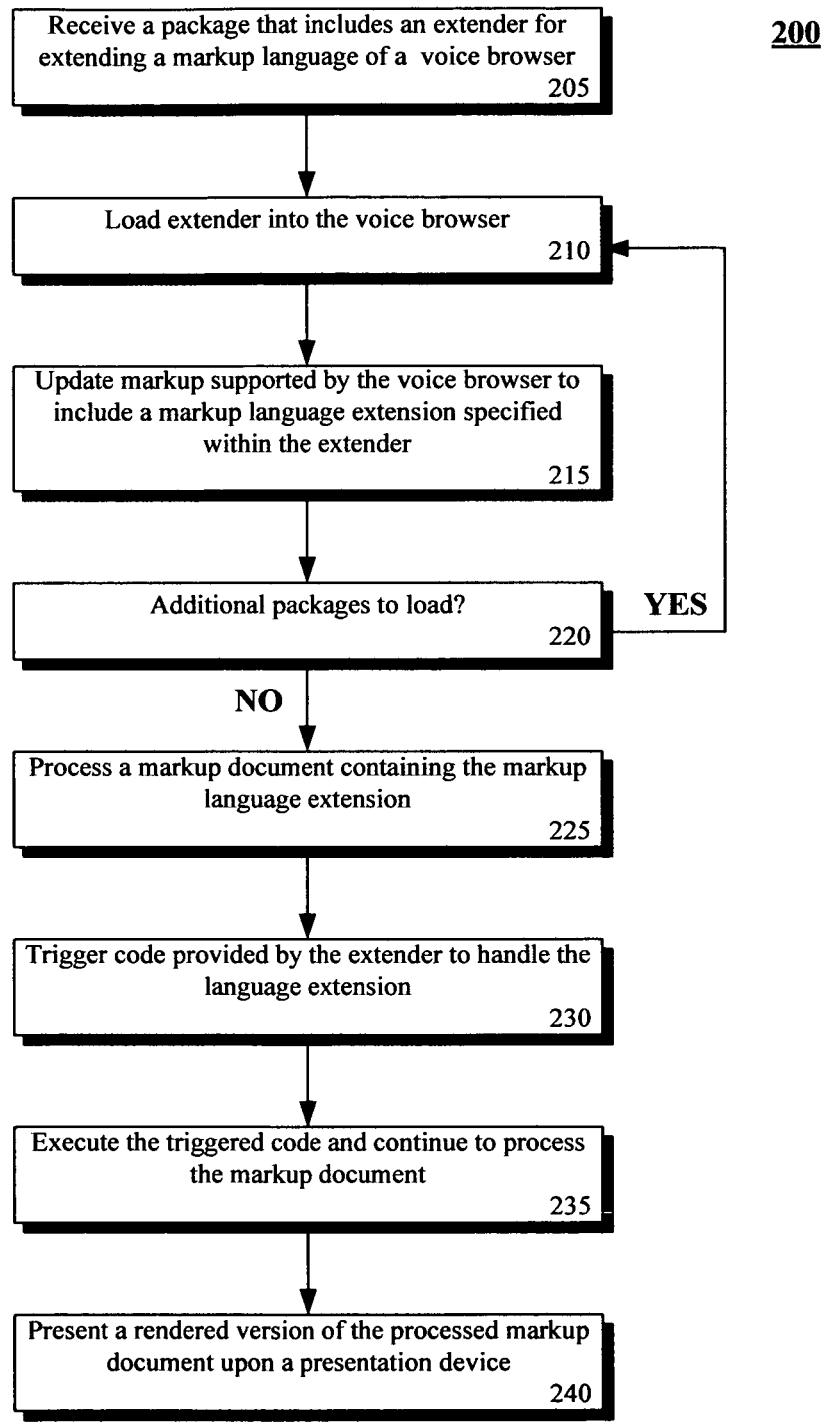
FIG. 2 is a flow chart of a method for extending markup language of a voice browser in accordance with an embodiment of the inventive arrangements disclosed herein

FIG. 2 is a flow chart of a method 200 for extending markup language of a voice browser in accordance with an embodiment of the inventive arrangements disclosed herein. In one embodiment, method 200 can be performed in the context of system 100. Method 200 is not limited in this regard, however, and can be performed in the context of any voice browser or voice-based markup interpreting software component having an extensible framework for extending a supported markup language at run time.

Method 200 can begin in step 205, where a voice browser can receive a package that includes an extender. The extender can specify a markup language extension for the voice browser. The voice browser can support any voice-based markup language. A voice-based markup language can follow all the syntactic rules of an SGML based markup language, such as XML, and also include semantics that support the creation of interactive speech applications. For example, a voice-based markup language can include a VoiceXML based markup language, such as VoiceXML, Call Control eXtensible Markup Language (CCXML), X+V, Speech Application Language Tags (SALT), and the like.

In step 210, the extender can be loaded into the browser. In step 215, the markup supported by the browser can be updated to include the markup language extension specified within the extender. That is, the voice browser can include an RI that defines a manner that the voice browser interprets voice-based markup. The RI can be extended by the extender. The extender can include a definition for new markup not previously part of the RI and/or the extender can replace an existing functionality of the RI with a different implementation for the functionality.

In step 220, a determination can be made as to whether additional extension packages exist. Each extension package can include one or more extender. If extension packages exist, the method can loop from step 220 to step 210, where each package and included extender can be loaded in turn. Otherwise, the method can proceed from step 220 to step 225.

In step 225, a markup document containing the markup language extension can be processed by the voice browser. In step 230, code provided by the extender to handle the language extension can be triggered. In step 235, the triggered code can execute. After the extender provided code is executed, the voice-based markup document can continue to be processed in a normal fashion. If the extender provided code is executed at a location external to the voice browser, control can pass to the external code segment in step 230, the extender provided code can be executed in step 235, and then control can be passed back the voice browser.

In step 240, once the markup document has been processed, resulting output can be presented upon a presentation device. For example, when the browser is a multi-modal Web browser and the presentation device a computer, the voice-based markup document can be visually and/or audibly rendered by the computer. In another example, the browser can be a voice browser used by an IVR system and the presentation device can be an audio device, such as a telephone or other telephony device. An audio rendering of the voice-based markup can be played though an audio transceiver of the audio device.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for extending supported voice markup comprising:

receiving, at a computing device hosting a software component that interprets voice-based markup in accordance with a markup reference implementation defining one or more markup tags, a voice based markup document;

parsing the voice based markup document, performed by the software component;

determining, responsive to the parsing, that the voice based markup document contains a new voice markup tag distinct from the one or more markup tags, wherein the new markup tag is not included in the markup reference implementation of the software component;

receiving, at the computing device, a plug-in, containing a definition for the new voice markup tag;

at runtime, dynamically modifying the markup reference implementation by adding the definition of the new voice markup tag to the markup reference implementation to produce a modified markup reference implementation; and using the modified markup reference implementation by the software component to interpret the voice-based markup document.

2. The method of claim 1, wherein the plug-in further comprises at least one type attribute definition for the new voice markup tag.

3. The method of claim 1, wherein the voice-based markup is compliant with a VoiceXML based markup language.

4. The method of claim 1, wherein the software component is a multi-modal Web browser operating on a client device and providing a graphical user interface.

5. The method of claim 1, wherein the software component is a voice markup interpreter utilized by an interactive voice response (IVR) system.

6. The method of claim 5, wherein one of the plug-in is received with the voice based markup document from a common source in a package with the voice based markup document.

7. The method of claim 1, wherein the new markup tag is a first new markup tag, the method further comprises determining that the voice based markup document contain a second new markup tag that was not previously part of the reference implementation; receiving a definition for the second new markup tag; and at runtime, modifying the markup reference implementation to include the definition of the second new markup tag to produce the modified reference implementation.

8. The method of claim 1, wherein the new markup tag replaces an existing functionality of the markup reference implementation with a different implementation for the functionality.

9. The method of claim 1, said modifying step further comprising: defining a parsing context and an execution context for the plug-in using a context module.

10. The method of claim 9, wherein said context module utilizes standardized Application Program Interfaces for controlling operations related to speech, telephony, and media performed by the software component.

11. The method of claim 9, wherein said parsing context is associated with a Document Object Model (DOM), and wherein the parsing context adds a document type definition (DTD) snippet contained in the plug-in to a pre-existing static DTD to produce an operational DTD used in parsing markup documents.

12. The method of claim 9, wherein said execution context is associated with at least one of a prompt queue, a grammar stack, a platform service, and an ecmaScript execution environment.

13. A method for extending markup supported by a voice browser comprising:
  receiving, at a computing device hosting a voice browser, a package comprising a voice based markup document in a voice-based markup language and an extender including a definition of a new voice markup tag, wherein the voice browser interprets information written in the voice-based markup language in accordance with a markup reference implementation including one or more markup tags distinct from the new voice markup tag;
  parsing the voice based markup document, performed by the voice browser;
  determining, responsive to the parsing, that the voice browser needs the extender for interpreting the voice based markup document;
  loading the extender at runtime while processing the voice based markup document; and
  at runtime, adding functionality of the extender to the markup reference implementation by adding the definition of the new voice markup tag to the markup reference implementation, in accordance with linking instructions provided by the extender to produce a modified reference implementation thereafter used by the voice-browser to interpret the voice based markup document.

14. The method of claim 13, wherein the method loads a plurality of extensions and thereafter extends the markup reference implementation to include the plurality of extensions, wherein the loading of the plurality of extensions occurs at approximately the same time, and wherein said plurality of extensions comprise at least one type attribute of the new markup tag.

15. The method of claim 13, further comprising: defining a plug-in framework for the voice-browser, wherein the extender is part of a plug-in package that complies with the plug-in framework, wherein the plug-in package comprises a code module of machine readable code for the at least one extension, and wherein the plug-in package comprises programmatic instructions for linking the code module to the reference implementation.

16. The method of claim 15, wherein the plug-in framework provides an ability for a plug-in package developer to specify when the voice-browser is to execute said code module.

17. The method of claim 16, wherein the time when the voice browser is to execute the code module is one of:
  a time when voice-based markup is parsed, a time when voice-based markup is processed, a time before the voice-browser receives input from a data source, a time after the voice-browser receives input from a data source, a time before output is processed, or a time after output is processed.

18. A computer program product containing computer executable code in a non-transitory storage medium for a computer implemented voice browser, the computer program product comprising:
  computer code operable to implement a voice based browser to interpret information in a voice based markup document written in a voice-based markup language;
  computer code operable to implement a plug-in framework; and
  computer code operable to utilize plug-in packages in compliance with said plug-in framework, wherein each of said plug-in packages include at least one definition of a new voice markup tag absent from a markup reference implementation supported by the voice browser without altering source code of the voice browser;
  wherein the plug-in packages dynamically extend the markup reference implementation of the voice browser at runtime by adding functionality to the markup reference implementation for the new voice markup tag subsequent to receiving the voice based markup document by the voice based browser to produce a modified reference implementation at runtime which is used by the voice browser to interpret the voice based markup document.

19. The computer program product of claim 18, wherein said reference implementation defines a manner that the voice browser interprets voice-based markup in accordance with standardized Voice XML markup definition.

20. The computer program product of claim 18, wherein at least one of the plug-in packages is conveyed with a voice based markup document containing the new markup element defined by the at least one plug-in package.

* * * * *